United States Patent
Satterfield

(10) Patent No.: US 9,255,833 B2
(45) Date of Patent: Feb. 9, 2016

(54) FAN VIBRATION TESTING APPARATUS

(71) Applicant: Hewlett-Packard Development Company, L.P., Houston, TX (US)

(72) Inventor: Brandon Scott Satterfield, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 422 days.

(21) Appl. No.: 13/735,675

(22) Filed: Jan. 7, 2013

(65) Prior Publication Data

US 2014/0190261 A1    Jul. 10, 2014

(51) Int. Cl.
*G01H 13/00* (2006.01)
*G01H 1/00* (2006.01)

(52) U.S. Cl.
CPC ..................... *G01H 1/003* (2013.01)

(58) Field of Classification Search
CPC .............................. G01H 1/003; G01H 13/00
USPC ............................................ 73/579, 493, 660
See application file for complete search history.

(56) References Cited

U.S. PATENT DOCUMENTS

| | | | |
|---|---|---|---|
| 6,217,270 B1 * | 4/2001 | Stager | 411/537 |
| 7,332,825 B2 * | 2/2008 | Annen et al. | 290/1 A |
| 7,481,116 B1 | 1/2009 | Osborn | |
| 2007/0288181 A1 | 12/2007 | Kuo et al. | |

FOREIGN PATENT DOCUMENTS

| | | | |
|---|---|---|---|
| CN | 2795509 | * | 7/2006 |
| CN | 101457749 A | | 6/2009 |
| CN | 201408104 | | 2/2010 |
| CN | 201811688 | | 4/2011 |
| KR | 20030035133 A | | 5/2003 |

OTHER PUBLICATIONS

Description English Translation for CN2795509, Tang, Jul. 2006.*
Wang, Chien-Chang, et al., "Axial Vibration Study of a Mobile Fan Motor", pp. 1397-1400; vol. 46; Issue: 6. Jun. 2010 < http://ieeexplore.eee.org/xpl/login.jsp?tp=&arnumber=5467667&url=http%3A%2F%2Fieeexplore.ieee.org%2Fiel5%2F20%2F5467355%2F05467667.pdf%3Farnumber%3D5467667 >.

* cited by examiner

*Primary Examiner* — J M Saint Surin
(74) *Attorney, Agent, or Firm* — Mannava & Kang, P.C.

(57) ABSTRACT

According to an example, a fan vibration testing apparatus includes a beam. The fan vibration testing apparatus further includes a fan mounting head disposed at a first location on the beam and including a cut-out, and a rod including first and second opposite rod ends. The rod may be attached at the first rod end to the fan mounting head, and the second rod end may be exposed to retain a fan within the cut-out.

15 Claims, 7 Drawing Sheets

FAN VIBRATION TESTING APPARATUS

BACKGROUND

Computer systems typically use fans to cool components thereof to prevent overheating of components that are sensitive to heat. Such fans typically include a frame that houses rotary fan blades. The rotary fan blades may be driven by a motor, and the frame may be mounted to an appropriate structure within a computer system. Operation of such fans can cause vibrations, which have been found to impact the operational characteristics of various computer system components.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
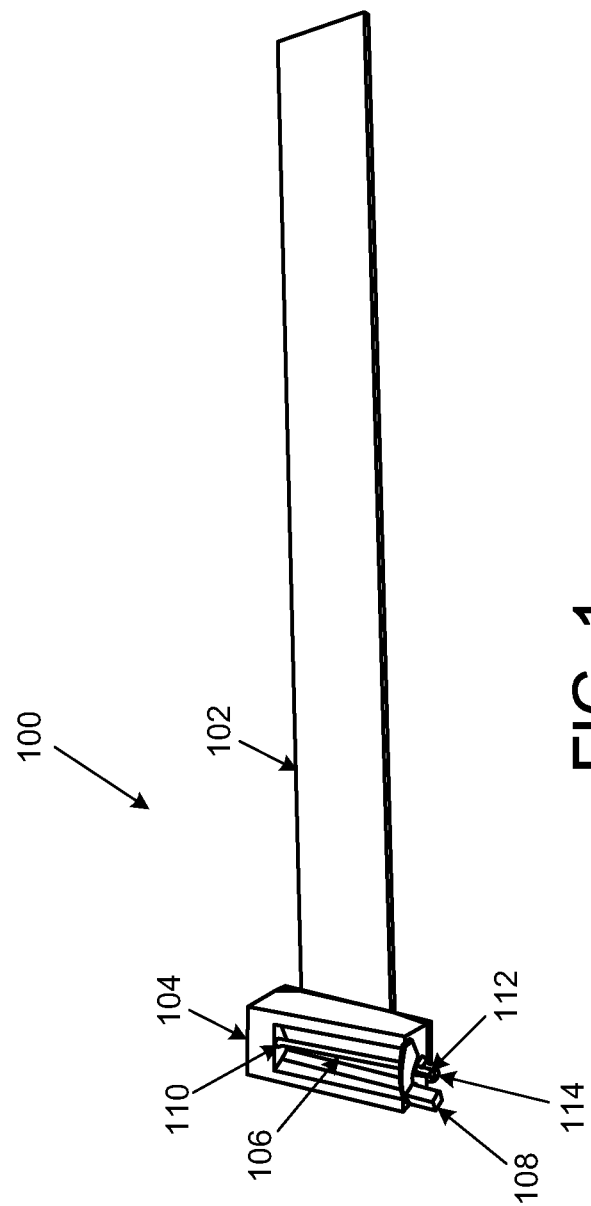
FIG. 1 illustrates an isometric view of a fan vibration testing apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In order to minimize noise, vibrations and other such issues that are caused by fans used in computer systems, the vibrational characteristics of such fans are typically tested by mounting a fan to a test apparatus. The test apparatus is typically used to grasp the outer surfaces of the frame that houses the rotary fan blades. The frame may be square, rectangular, or include another configuration. In order to minimize variations in test results between fans of different shapes and sizes, the test apparatus generally includes a clamp that is designed for a fan of a particular size. The clamp generally includes a thumb-screw that can be used to securely retain the fan to the test apparatus by adjusting the clamp. For testing a fan of a different size, a clamp specific to the fan size is used with the test apparatus and similarly a thumb-screw is used to securely retain the fan to the test apparatus.

Fans that are considered to be of the same size may include dimensional variations within predetermined manufacturing limits. Such dimensional variations can result in different amounts of pressure on the fan frame being applied by the test apparatus clamp, which can add unintended variations to the test results. As an operator rotates the thumb-screw to securely retain a fan in the test apparatus, the dimensional variations and amount of rotation of the thumb-screw can add further variations to the test results. Further, since fans often include different overall sizes based, for example, on the type of computer systems they are used with, a different clamp size and configuration is needed to clamp onto the outer surfaces of the frame that houses the rotary fan blades. Therefore, for each different fan size that is tested, the clamp fixture needs to be changed, thus adding delays to the overall testing process.

According to an example, a fan vibration testing apparatus is described herein and is used to collect vibrational data from a variety of fans used in computer systems and other such products. The fans that may be used with the fan vibration testing apparatus may be of different shapes and sizes. In addition, the fan vibration testing apparatus provides for maximum allowable degrees of freedom of vibration created by a fan being tested. The fan vibration testing apparatus generally includes a beam including a predetermined length and width. The predetermined length and width of the beam may be determined such that a natural frequency of the beam is different than a natural frequency of a fan mounting head and the fan. Differentiating the natural frequency of the beam from the natural frequency of the fan mounting head and the fan thus prevents influence of the beam natural frequency on any vibration results.

The fan vibration testing apparatus may further include a fan mounting head disposed at a first location on the beam, in which the fan mounting head includes a cut-out. For example, the fan mounting head may be disposed at an exposed end of the beam. The cut-out may generally include a U-shape, and one or more walls that include an angled ledge. The angled ledge may facilitate placement of a fan within the cut-out by providing a surface for the fan frame to contiguously engage. The angled ledge may thus match a frame surface of typical fans used in computer systems and other such products, such as televisions, audio receivers, etc. Fans of different sizes and shapes may also be disposed and retained in the cut-out of the fan mounting head.

The fan vibration testing apparatus may further include a rod including first and second opposite rod ends. The rod may be attached at the first rod end to the fan mounting head, and the second rod end may be exposed to retain a fan within the cut-out. A clamp may be rotatably mounted to the fan mounting head to prevent lateral movement of the rod. The clamp may include one or more teeth to engage the rod to prevent movement of the rod. The fan mounting head may include first and second opposite fan mounting head ends, with the first rod end being fixedly mounted to the first fan mounting head end, and the clamp being mounted to the second fan mounting head end. An accelerometer may be disposed adjacent to the fan mounting head to measure vibrations of the fan.

The fan vibration testing apparatus provides benefits, such as, a single fixture to test fans of various diameters and sizes. Based on the dimensions of the beam, all of the ranges of frequencies produced by a fan may be tested without interference from the fan vibration testing apparatus. The repeatable and uniform clamping of the fan within the fan mounting head cut-out provides a wide range of sensitivity to vibrations caused by a fan, and eliminates variance based on the user of the apparatus.

Figure 2:
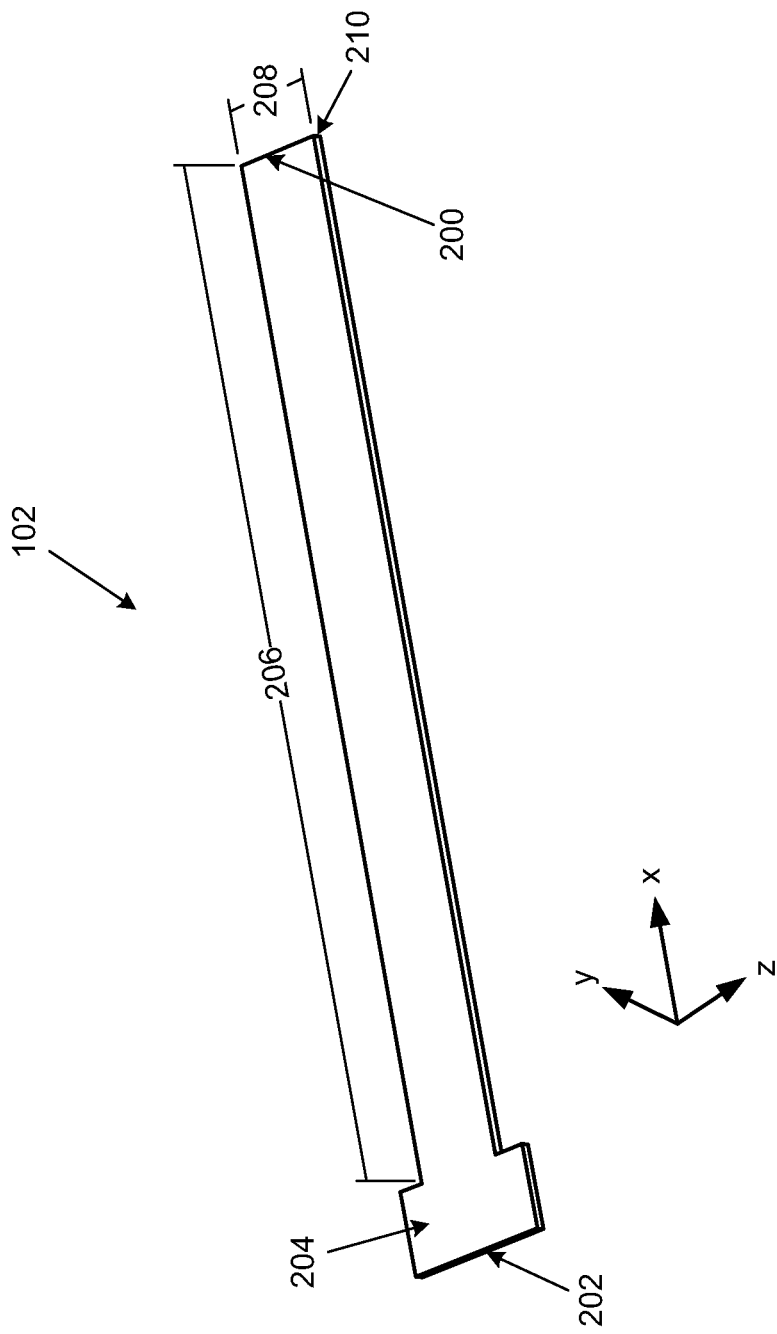
FIG. 2 illustrates an isometric view of a beam for supporting a fan and a fan mounting head, according to an example of the present disclosure.

FIG. 1 illustrates an isometric view of a fan vibration testing apparatus 100, according to an example. Referring to FIG. 1, the apparatus 100 is depicted as including a beam 102, a fan mounting head 104, a rod 106, and a clamp 108. Other features illustrated in FIG. 1 are described in conjunction with the operation of the fan vibration testing apparatus 100. In addition, FIG. 2 illustrates an isometric view of the beam 102 for supporting a fan and the fan mounting head 104, according to an example. Moreover, FIG. 3 illustrates an isometric view of the fan mounting head 104, and FIG. 4 illustrates an isometric view of the clamp 108 for securely retaining a fan within the fan mounting head 104, according to examples.

Referring to FIGS. 1 and 2, the beam 102 may include first and second beam ends 200, 202. The first beam end 200 may be fixedly mounted, for example, to a vice or another such device for holding the second beam end 202 in an exposed manner. The second beam end 202 may include an enlarged area 204 for fixedly mounting the fan mounting head 104 thereon. The beam 102 may include a predetermined length 206, width 208, and thickness 210 such that a natural frequency of the beam 102 is different than a natural frequency of the fan mounting head 104 and a fan 600 (see FIG. 6). For example, given a beam of a predetermined width 208 and thickness 210 sufficient to securely retain the mass of the fan mounting head 104 and the fan 600, the length 206 of the beam 102 may be determined such that the fan 600 is free to vibrate, and the natural frequency of the beam 102 is different than a natural frequency of the fan mounting head 104 and the fan 600. The natural frequency determination may thus be based on the material properties of the beam 102, the fan mounting head 104, and the mass of typical fans 600 being tested. The beam 102 may be made of steel, plastic, aluminum, combinations or alloys of materials, etc.

Figure 3:
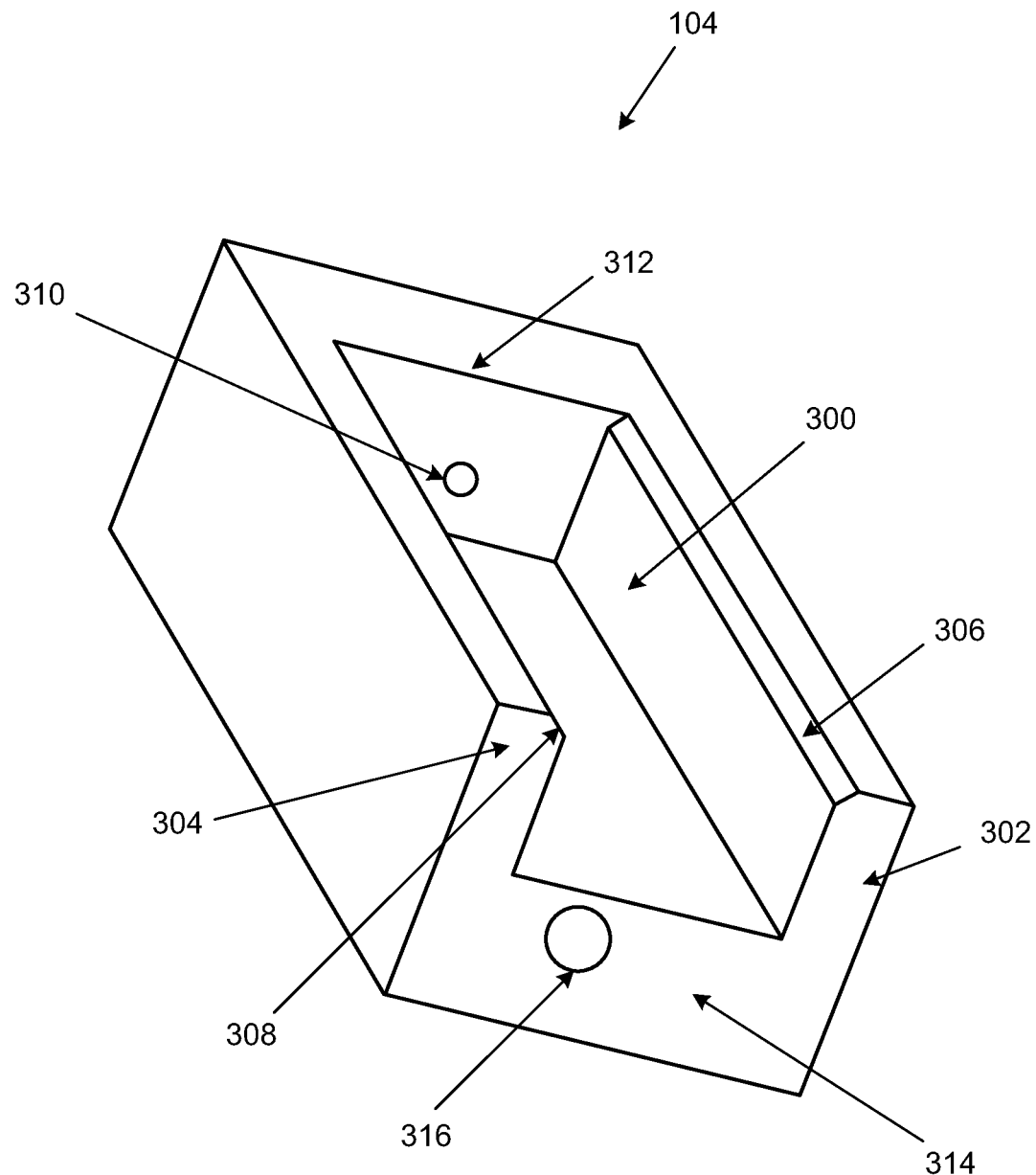
FIG. 3 illustrates an isometric view of the fan mounting head, according to an example of the present disclosure.

Referring to FIGS. 1 and 3, the fan mounting head 104 may include a cut-out 300. In the example shown, the cut-out 300 may be generally U-shaped. The fan mounting head 104 may include walls 302, 304, each including angled ledges 306, 308, respectively. The angled ledges 306, 308 may facilitate placement of the fan 600 as shown in FIG. 6 within the cut-out 300 by providing a surface for a fan frame 602 to contiguously engage. The angled ledges 306, 308 may thus match a frame surface of typical fans used in computer systems and other such products. In an example, the ledges 306, 308 may be angled at approximately 45° relative to the walls 302, 304. Those skilled in the art would appreciate in view of this disclosure that the ledges 306, 308 may be formed at different angles or a different configuration based on the outer surface configuration of the fan frame 602. The fan mounting head 104 may include a hole 310 for fixedly retaining the rod 106 including first and second opposite rod ends 110, 112. The fan mounting head 104 may include first and second opposite fan mounting head ends 312, 314. The first rod end 110 may be fixedly mounted to the first fan mounting head end 312 by being disposed within the hole 310 and fixedly retained therein. The rod 106 may be formed, for example, of a hardened steel material to translate vibrations to an accelerometer 500 (see FIG. 5). The clamp 108 may be rotatably mounted to the second fan mounting head end 314. For example, the clamp 108 may be rotatably mounted to the second fan mounting head end 314 using a threaded bolt 114 engaged with threaded hole 316 for frictional engagement with the fan mounting head 104. Those skilled in the art would appreciate in view of this disclosure that other methods may be used for mounting the clamp 108 to fan mounting head 104, such as a spring loaded engagement between the clamp 108 and the fan mounting head 104. The fan mounting head 104 may be formed of aluminum, or another similar material.

Figure 4:
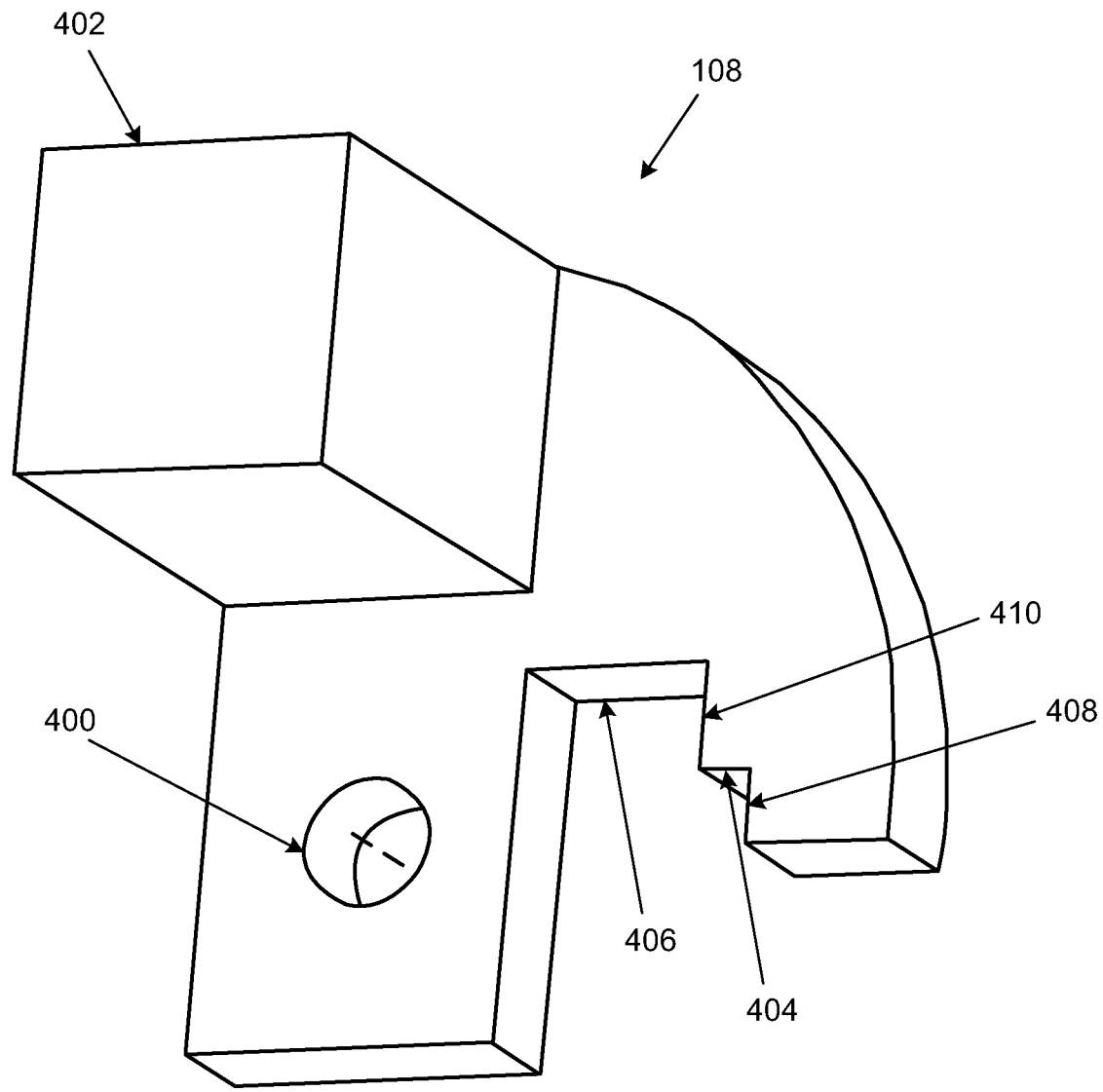
FIG. 4 illustrates an isometric view of a clamp for securely retaining a fan within the fan mounting head, according to an example of the present disclosure.

Referring to FIGS. 1 and 4, the clamp 108 may include a hole 400 that is used by the threaded bolt 114 to rotatably mount the clamp 108 to the second fan mounting head end 314. The clamp 108 may include a handle 402 to rotate the clamp 108 in a counter-clockwise direction in the mounted orientation of FIG. 1 to release the rod 106, and in an opposite clockwise direction in the mounted orientation of FIG. 1 to prevent movement of the second opposite rod end 112. One or more teeth 404, 406 may be used to engage the rod 106 to prevent movement thereof. The teeth 404, 406 may be dimensioned to engage the rod 106 to prevent movement of the rod 106 when the rod is disposed in fan frames 602 of different sizes. For example, the tooth 404 may be used to accommodate larger fans, whereas the tooth 406 may be used to accommodate smaller fans. The teeth 404, 406 may also provide for adequate retention of the exposed rod end 112 by accommodating any dimensional variations in the fan frames 602. For example, the tooth 404 may be engaged with the rod 106 to provide a first amount of force on the rod 106, and the tooth 406 may be engaged with the rod 106 to provide a second greater amount of force on the rod 106. Those skilled in the art would appreciate in view of this disclosure that the teeth 404, 406 may be modified in different configurations suitable for engaging the rod 106 and preventing movement thereof. For example, the teeth 404, 406 may be disposed at angles or rounded, or the walls 408, 410 adjacent to the teeth 404, 406 may be angled or rounded to provide a wedging action against the rod 106.

Figure 5:
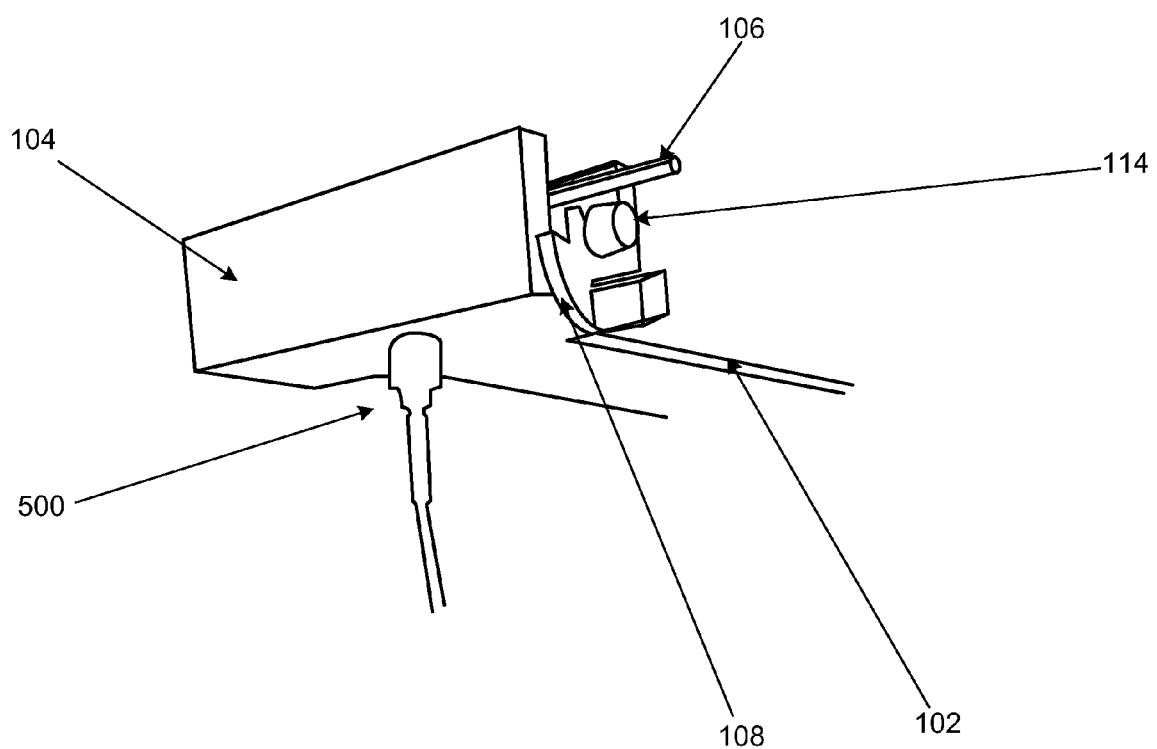
FIG. 5 illustrates another isometric view of the fan vibration testing apparatus, including an accelerometer attached thereto, according to an example of the present disclosure.
Figure 6:
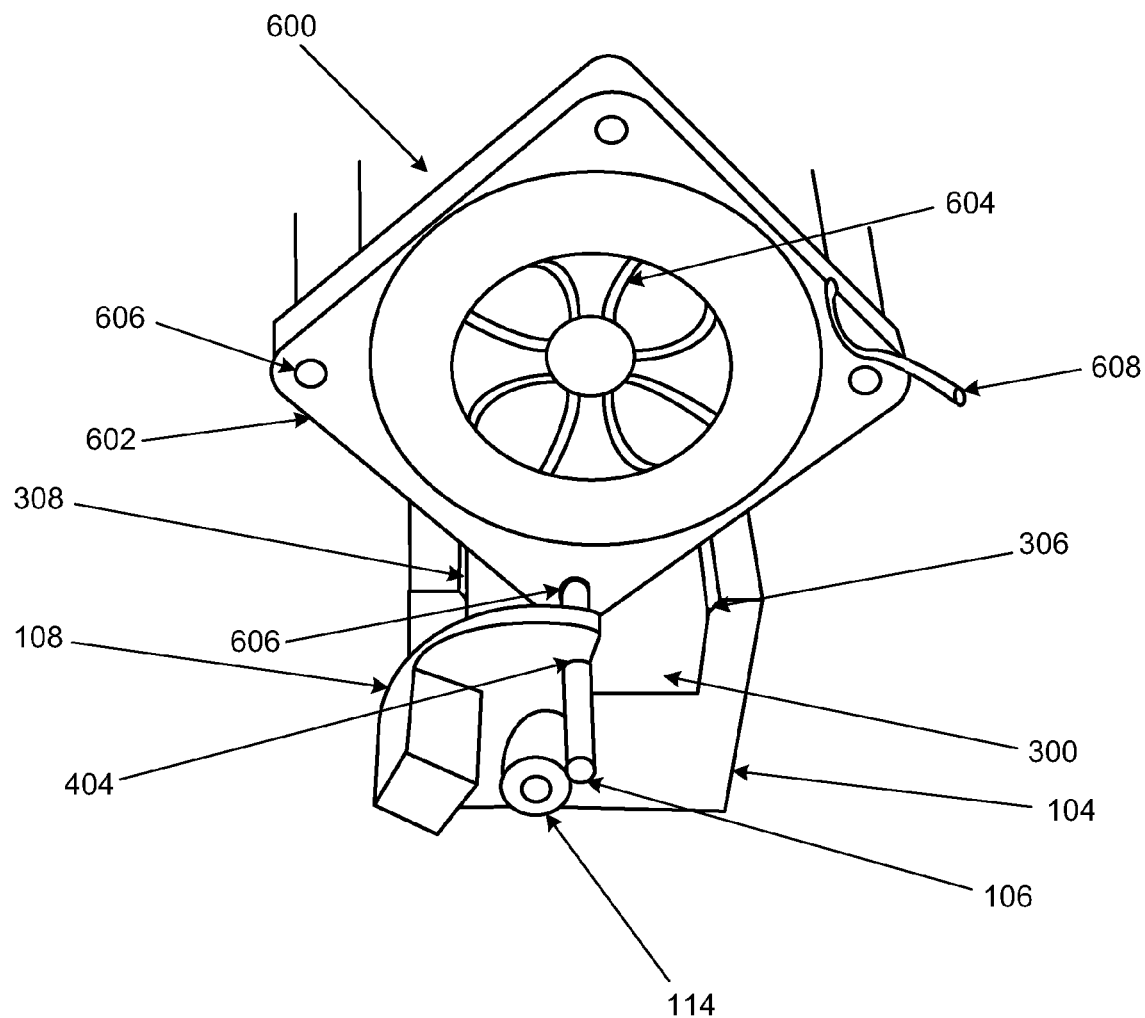
FIG. 6 illustrates an isometric view of a fan retained within the fan mounting head, according to an example of the present disclosure.

Referring to FIGS. 1 and 5, which illustrates another isometric view of the fan vibration testing apparatus 100 according to an example, the accelerometer 500 may be mounted adjacent to the fan mounting head 104 to measure vibrations of the fan 600. For example, the accelerometer 500 may be mounted directly below the center of mass of the fan 600 and the fan mounting head 104. The accelerometer 500 may be a tri-axial accelerometer for measuring vibrations of the fan 600 along an x-axis defined along the length of the beam 102, and a y-axis and z-axis as shown in FIG. 2. Those skilled in the art would appreciate in view of this disclosure that other methods may be used to measure vibrations of the fan 600, and the accelerometer 500 may be disposed at other locations on the beam 102.

Referring to FIGS. 1 and 6, which illustrates an isometric view of a fan retained within the fan mounting head 104 according to an example, the fan 600, including the fan frame 602, may further include fan blades 604. The fan frame 602 may include holes 606 that are uniformly provided in the fan frame 602 for mounting the fan 600 to a computer system or similar product (not shown). Although the length of the fan along the fan axis, the frame width, and other dimensions of the fan frame 602 may vary for different fans, the fan 600 typically includes uniformly disposed holes 606. Moreover, even if the fan frame 602 is of a different configuration (e.g., circular, oval, etc.), such fan frame configurations may still be used with the fan vibration testing apparatus 100 if the rod 106 can be disposed in one of the holes in the fan frame, or if the fan frame can be otherwise retained within the cut-out 300 of the fan mounting head 104. In order to test the fan 600 for vibrations, the fan 600 may be positioned in the cut-out 300 of the fan mounting head 104 by inserting the rod 106 in one of the holes 606 in the fan frame 602. In this position, the outer surfaces of the fan frame 602 contiguously engage the angled-ledges 306, 308, which as discussed above may be angled at approximately 45° relative to the walls 302, 304. With the fan 600 retained in the cut-out 300, the clamp 108 may be rotated to engage the tooth 404 with the rod 106 to thus securely retain the rod 106 and the fan 600 within the cut-out 300. The wiring 608 of the fan 600 may be used to operate the fan 600, and the accelerometer 500 may be used to measure vibrations of the fan 600.

Figure 7:
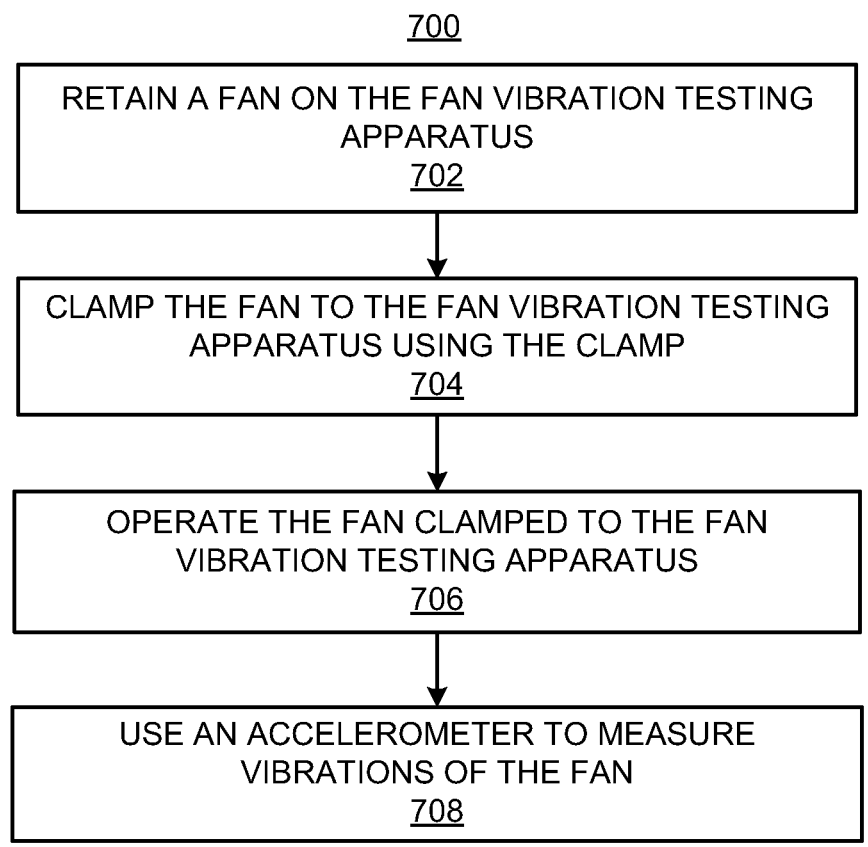
FIG. 7 illustrates a flowchart of a method for fan vibration testing, according to an example of the present disclosure.

FIG. 7 illustrates a flowchart of a method 700 for fan vibration testing, corresponding to the example of the fan vibration testing apparatus 100 whose construction is described in detail above. The method 700 may be implemented on the fan vibration testing apparatus 100 with reference to FIG. 1 by way of example and not limitation.

Referring to FIG. 7, for the method 700, at block 702, the fan 600 may be retained on the fan vibration testing apparatus 100 of FIG. 1. As discussed herein, the fan vibration testing apparatus 100 may generally include a beam 102 including the predetermined length 206 and width 208. The fan vibration testing apparatus 100 may further include the fan mounting head 104 disposed at the second beam end 202 on the beam 102 and including the cut-out 300. The fan mounting head 104 may include the first and second opposite fan mounting head ends 312, 314. The fan vibration testing apparatus 100 may further include the rod 106 including the first and second opposite rod ends 110, 112, with the rod being attached at the first rod end 110 to the fan mounting head 104, and the second rod end 112 being exposed to retain the fan 600 within the cut-out 300. The fan vibration testing apparatus 100 may further include the clamp 108 mounted to the second fan mounting head end 314.

At block 704, the fan 600 may be clamped to the fan vibration testing apparatus 100 using the clamp 108.

At block 706, the fan 600 clamped to the fan vibration testing apparatus 100 may be operated using the wiring 608.

At block 708, the accelerometer 500 may be used to measure vibrations of the fan 600.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A fan vibration testing apparatus comprising:
    a beam;
    a fan mounting head disposed at a first location on the beam and including a cut-out shaped to at least partially receive a fan frame including a fan; and
    a rod including first and second opposite rod ends, the rod being attached at the first rod end to the fan mounting head, and the second rod end being exposed to retain the fan frame including the fan at least partially within the cut-out.

2. The fan vibration testing apparatus of claim 1, wherein the beam comprises a predetermined length and width that are selected such that a natural frequency of the beam is different than a natural frequency of the fan mounting head and the fan.

3. The fan vibration testing apparatus of claim 1, wherein the first location is an end of the beam.

4. The fan vibration testing apparatus of claim 1, wherein the cut-out is generally U-shaped.

5. The fan vibration testing apparatus of claim 1, wherein the cut-out includes at least one wall including an angled ledge configured to support a wall of the fan frame including the fan.

6. The fan vibration testing apparatus of claim 1, wherein the second rod end protrudes from the cut-out.

7. The fan vibration testing apparatus of claim 1, further comprising a clamp mounted to the fan mounting head to prevent movement of the rod.

8. The fan vibration testing apparatus of claim 7, wherein the fan mounting head includes first and second opposite fan mounting head ends, the first rod end is fixedly mounted to the first fan mounting head end, and the clamp is mounted to the second fan mounting head end.

9. The fan vibration testing apparatus of claim 8, wherein the clamp is rotatably mounted to the second fan mounting head end to prevent movement of the rod.

10. The fan vibration testing apparatus of claim 7, wherein the clamp includes a tooth to engage the rod to prevent movement of the rod.

11. The fan vibration testing apparatus of claim 7, wherein the clamp includes a plurality of teeth dimensioned to engage the rod to prevent movement of the rod when the rod is disposed in fan frames of different sizes.

12. The fan vibration testing apparatus of claim 1, further comprising an accelerometer to measure vibrations of the fan.

13. The fan vibration testing apparatus of claim 12, wherein the accelerometer is disposed adjacent to the fan mounting head.

14. A method for fan vibration testing comprising:
    retaining a fan on a fan vibration testing apparatus comprising:
        a beam;
        a fan mounting head disposed at a first location on the beam and including a cut-out shaped to at least partially receive a fan frame including the fan, wherein the fan mounting head includes first and second opposite fan mounting head ends;
        a rod including first and second opposite rod ends, the rod being attached at the first rod end to the fan mounting head, and the second rod end being exposed to retain the fan frame including the fan at least partially within the cut-out; and
        a clamp mounted to the second fan mounting head end;
    clamping the fan frame including the fan to the fan vibration testing apparatus using the clamp;
    operating the fan clamped to the fan vibration testing apparatus; and
    using an accelerometer to measure vibrations of the fan.

15. The method of claim 14, further comprising:
    clamping the fan frame including the fan by using a tooth on the clamp to engage the rod to prevent movement of the rod.

* * * * *